United States Patent
Ma

(10) Patent No.: US 10,956,280 B2
(45) Date of Patent: Mar. 23, 2021

(54) DATA BACKUP METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Zhifeng Ma, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/339,721

(22) PCT Filed: Jul. 18, 2017

(86) PCT No.: PCT/CN2017/093431
§ 371 (c)(1),
(2) Date: Apr. 4, 2019

(87) PCT Pub. No.: WO2018/076818
PCT Pub. Date: May 3, 2018

(65) Prior Publication Data
US 2019/0317864 A1    Oct. 17, 2019

(30) Foreign Application Priority Data
Oct. 25, 2016 (CN) .......................... 201610939625.3

(51) Int. Cl.
G06F 11/14  (2006.01)
G06F 3/06   (2006.01)
H04L 29/08  (2006.01)

(52) U.S. Cl.
CPC .......... *G06F 11/1464* (2013.01); *G06F 3/067* (2013.01); *H04L 67/1097* (2013.01)

(58) Field of Classification Search
CPC ... G06F 3/067; G06F 11/1464; H04L 67/1097
USPC ......................................................... 711/162
See application file for complete search history.

(56) References Cited

U.S. PATENT DOCUMENTS

2008/0250083 A1   10/2008  Kovacs et al.
2011/0276823 A1   11/2011  Ueno et al.
2013/0325809 A1*  12/2013  Kim .................... G06F 11/1451
                                                707/640
(Continued)

FOREIGN PATENT DOCUMENTS

CN    1896961       1/2007
CN    101764880     6/2010
(Continued)

OTHER PUBLICATIONS

SIPO, First Office Action for CN Application No. 201610939625, dated Sep. 25, 2018.
(Continued)

*Primary Examiner* — Hua J Song
(74) *Attorney, Agent, or Firm* — Hodgson Russ LLP

(57) ABSTRACT

Provided are a data backup method, electronic device, and storage medium, the data backup method including: acquiring application data to be backed up and update frequencies of the application data in the terminal; generating backup priorities based on the update frequencies; transmitting the application data to be backed up to a server based on the backup priorities.

17 Claims, 4 Drawing Sheets

(56) References Cited

U.S. PATENT DOCUMENTS

| | | | |
|---|---|---|---|
| 2014/0068212 A1 | 3/2014 | Lin et al. | |
| 2015/0081641 A1 | 3/2015 | Brewer et al. | |
| 2015/0278024 A1* | 10/2015 | Barman | G06F 11/1466 |
| | | | 707/634 |

FOREIGN PATENT DOCUMENTS

| | | |
|---|---|---|
| CN | 102750205 | 10/2012 |
| CN | 103401904 | 11/2013 |
| CN | 103455389 | 12/2013 |
| CN | 104866389 | 8/2015 |
| CN | 105138422 | 12/2015 |
| CN | 105677517 | 6/2016 |
| CN | 105868054 | 8/2016 |
| CN | 106502834 | 3/2017 |

OTHER PUBLICATIONS

WIPO, ISR for PCT/CN2017/093431, Sep. 30, 2017.
SIPO, Second Office Action for CN Application No. 201610939625, dated Apr. 1, 2019.
EPO, Office Action for EP Application No. 17865447.1, dated Sep. 3, 2019.
IP India, Office Action for IN Application No. 201917019118, dated Feb. 2, 2021.

* cited by examiner

DATA BACKUP METHOD, ELECTRONIC DEVICE, AND STORAGE MEDIUM

This application is a U.S. national phase application of International Application No. PCT/CN2017/093431, filed on Jul. 28, 2017, which is based on and claims priority to Chinese Patent Application No. 201610939625.3, filed on Oct. 25, 2016, the entire disclosures of which are incorporated herein by reference.

FIELD

The present disclosure relates to a terminal technology field, and more particularly to a data backup method, an electronic device, and a storage medium.

BACKGROUND

With popularization of terminals, cloud services corresponding to terminals are developed continuously. By backing up data to a cloud server, a risk of data loss can be avoided effectively, thus bringing more conveniences to users. At present, a user may apply for only one account, and the cloud service can be used on a plurality of terminals, such that the data of different terminals can be backed up to the cloud server conveniently, thus it is unnecessary to apply for a plurality of accounts repeatedly.

DISCLOSURE

Embodiments of the present disclosure provide a data backup method, an electronic device, and a storage medium.

Embodiments of the present disclosure provide a data backup method in a terminal. The data backup method includes: acquiring application data to be backed up and update frequencies of the application data in the terminal; generating backup priorities based on the update frequencies; and transmitting the application data to be backed up to a server based on the backup priorities.

Embodiments of the present disclosure provide a non-transient computer-readable storage medium. The storage medium stores a plurality of instructions. When the plurality of instructions are suitable to be located by a processor, so as to cause the processor to perform the data backup method described above.

Embodiments of the present disclosure provide an electronic device. The electronic device includes a processor and a memory. The processor is coupled to the memory electrically. The memory is configured to store instructions and data. The processor is configured to perform: acquiring application data to be backed up and update frequencies of the application data in the electronic device; generating backup priorities based on the update frequencies; and transmitting the application data to be backed up to a server based on the backup priorities.

EMBODIMENTS OF THE PRESENT DISCLOSURE

Figure 1:
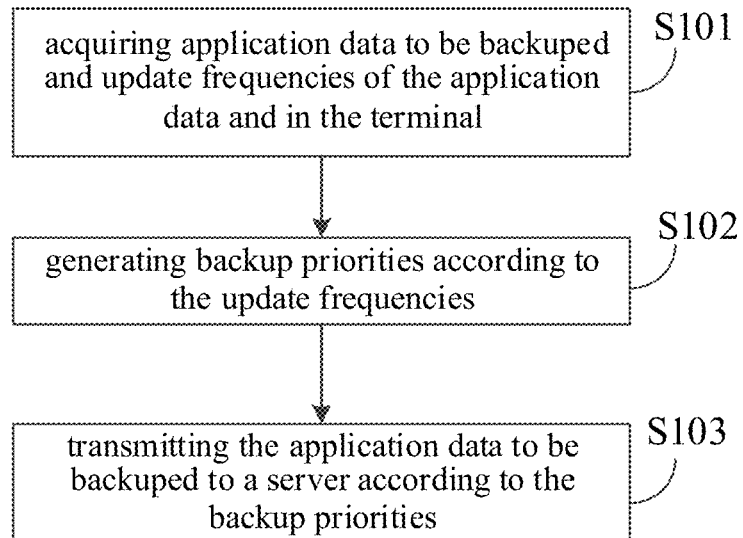
FIG. 1 is flow chart of a data backup method according to an embodiment of the present disclosure.

To illustrate the solutions according to the embodiments of the present disclosure or in the prior art more clearly, accompanying drawings needed for describing the embodiments or the prior art are briefly introduced below. Obviously, the accompanying drawings in the following descriptions are merely some embodiments of the present disclosure, and persons of ordinary skill in the art may obtain other drawings according to the accompanying drawings without making creative efforts.

Terms such as "first", "second" and "third" are only used for distinguishing one element from another element rather than for describing a particular sequence. It should be further understood that, when used in the specification, terms "comprising" and/or "containing" specify the presence of stated features, operations, elements and/or components, but do not exclude the presence or addition of one or more other features, operations, elements, components and/or groups thereof.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Data of applications of a terminal has different update frequencies, and the update frequencies decide usage frequencies of the applications. The data with higher update frequency is frequently used by the user, i.e., the data having a higher user attention-degree. Since the backup methods in the related art cannot back up data according to the update frequencies, the data with higher update frequency may be not backed up in real time, such that the user cannot perform effective synchronization on the data having a higher attention-degree.

Embodiments of the present disclosure provide a data backup method. The data backup method includes: acquiring application data to be backed up and update frequencies of the application data in a terminal; generating backup priorities based on the update frequencies; and transmitting the application data to be backed up to a server based on the backup priorities.

In some embodiments, transmitting the application data to be backed up to the server based on the backup priorities includes: transmitting the application data to be backed up corresponding to a current priority to the server; detecting whether the application data to be backed up corresponding to the current priority is completely transmitted; and transmitting the application data to be backed up corresponding to a next priority to the server, in response to detecting that the application data to be backed up corresponding to the current priority is completely transmitted. The current priority is higher than the next priority.

In some embodiments, in response to detecting that the application data to be backed up corresponding to the current priority is not completely transmitted, the method further includes: detecting whether a current network connection state of the terminal is in a disconnection state; and recording backup progress information of the application data to be backed up corresponding to the current priority, in response to detecting that the current network connection state of the terminal is in the disconnection state.

In some embodiments, the method further includes: continuing to detect whether the application data to be backed up corresponding to the current priority is completely transmitted, in response to detecting that the current network connection state of the terminal is not in the disconnection state.

In some embodiments, generating the backup priorities based on the update frequencies includes: ranking the update frequencies based on a predetermined rule; and determining the backup priorities based on ranked update frequencies.

In some embodiments, acquiring the application data to be backed up includes: acquiring initial application data of an application in the terminal; acquiring current application data of the application after detecting a change of the initial application data of the application in the terminal; and acquiring the application data to be backed up based on the initial application data and the current application data.

In some embodiments, acquiring the application data to be backed up based on the initial application data and the current application data includes: acquiring difference between the initial application data and the current application data and determining the difference between the initial application data and the current application data as the application data to be backed up.

An execution subject of the data backup method provided by the embodiments of the present disclosure may be a data backup apparatus provided by the embodiments of the present disclosure, or a mobile terminal (such as a notebook computer, a tablet computer, a mobile phone, a wearable device or the like) integrated with the data backup apparatus. The data backup apparatus may be implemented by hardware or software.

As illustrated in FIG. 1, FIG. 1 is a flow chart of the data backup method according to an embodiment of the present disclosure.

The data backup method according to the embodiment of the present disclosure may include the followings.

At block S101, application data to be backed up and update frequencies of the application data and in the terminal are acquired.

For example, the terminal is provided with a plurality of applications, such as a photo application, an address book application and so on. For each application, the terminal acquires the update frequency of application data and acquires application data to be backed up. For example, the terminal acquires the data update frequency of each application within a certain time period.

The applications may be applications to be backed up specified by a user. For example, if the user sets the terminal in advance to merely back up some applications, the terminal may merely acquire the update frequencies and the data to be backed up of these applications.

In some embodiments, the data to be backed up of an application may be acquired as follows. The terminal acquires initial application data of the application. When detecting a change of the initial application data of the application, the terminal acquires current application data of the application, acquires difference between the current application data and the initial application data, and determines the difference between the current application data and the initial application data as the application data to be backed up. In an embodiment, if the current application data is greater than the initial application data, the difference between the current application data and the initial application data is determined as the application data to be backed up, i.e., the application data to be backed up is determined as incremental data.

At block S102, backup priorities are generated according to the update frequencies.

For example, the terminal acquires a sequence of backing up the application data (i.e., backup priorities) according to the update frequencies of the application data. For example, the terminal ranks the update frequencies from higher to lower or from lower to higher. The update frequency of the application data decides a usage frequency (i.e., user attention-degree) of the application data.

Although the user sets the terminal in advance to merely back up some applications, the terminal may acquire a sequence of backing up these applications according to the update frequencies of these applications.

In some embodiments, the terminal may also generate the backup priorities in other ways. For example, the terminal acquires a data change of the terminal within a certain time period, and generates the backup priorities of the data change and the update frequencies. In detail, the terminal may store an association table with correspondence between data changes, update frequencies and backup priorities, and acquire the backup priorities by querying the association table.

At block S103, the application data to be backed up is transmitted to a server according to the backup priorities.

For example, the terminal transmits the application data to be backed up to the server according to the sequence of backing up the application data acquired in block S102, and the server stores the application data to be backed up.

With the data backup method according to the embodiments of the present disclosure, application data to be backed up and update frequencies of the application data in a terminal are acquired, backup priorities are generated according to the update frequencies and the application data to be backed up is transmitted to a server according to the backup priorities. Since the backup frequency of application data is acquired and the backup priorities of the application data are determined according to the backup frequency, the application data having higher user attention-degree can be backed up in real time, such that timeliness and flexibility of backup can be improved.

Figure 2:
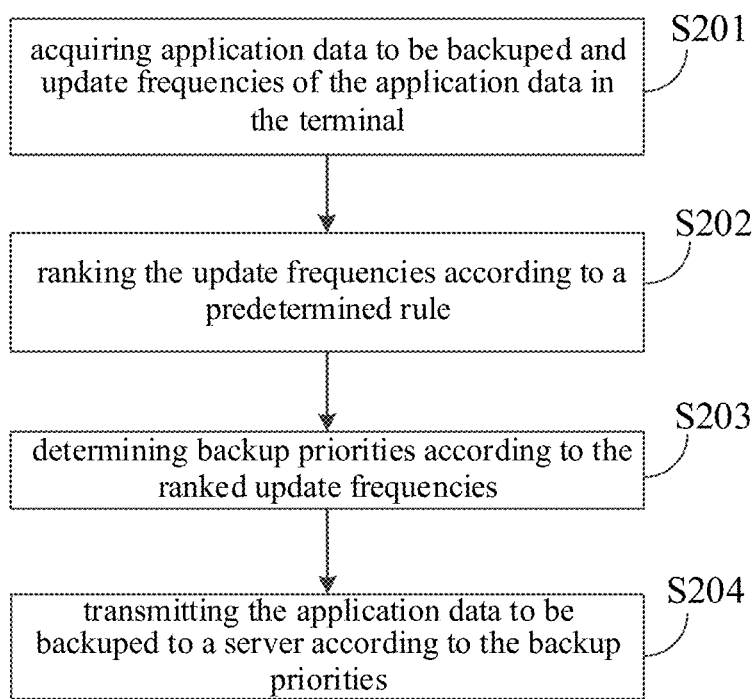
FIG. 2 is a flow chart of a data backup method according to another embodiment of the present disclosure.

As illustrated in FIG. 2, FIG. 2 is a flow chart of a data backup method according to another embodiment of the present disclosure.

The data backup method according to the embodiment may include the followings.

At block S201, application data to be backed up and update frequencies of the application data in the terminal are acquired.

For example, the terminal is provided with a plurality of applications, such as a photo application, an address book application and so on. The terminal acquires the application data to be backed up and the update frequency of the application data. The terminal acquires the update frequencies of the application data in the terminal as follows.

(1) The update frequencies of the application data within a predetermined time period are acquired.

For example, the terminal acquires an update count of the application data of each application within a certain time period. For example, the terminal acquires the update count of the application data in three days, and divides the update count by a number of days to acquire the update frequency.

The applications may be applications to be backed up specified by a user. For example, if the user sets the terminal in advance to merely back up some applications, the terminal may merely acquire the update frequencies of these applications.

At block S202, the update frequencies are ranked according to a predetermined rule.

For example, the terminal acquires a sequence of backing up the application data (i.e., backup priorities) according to the update frequencies of the application data. For example, the terminal ranks the update frequencies from higher to lower or from lower to higher. The update frequency of the application data decides a usage frequency or a user attention-degree of the application data. The higher the update frequency is, the higher the user attention-degree is.

Although the user sets the terminal in advance to merely back up some applications, the terminal may rank the update frequencies of these applications from higher to lower.

At block S203, backup priorities are determined according to the ranked update frequencies.

For example, the terminal acquires the backup priorities of the applications according to the update frequencies ranked from higher to lower. The terminal may back up the application data to be backed up having a high update frequency, and back up the application data to be backed up having a low update frequency.

At block S204, the application data to be backed up is transmitted to a server according to the backup priorities.

For example, the terminal transmits the application data to be backed up to the server according to the sequence of backing up the application data acquired in block S203, and the server stores the application data to be backed up.

In order to improve a data transmission efficiency, the terminal may transmit the application data to be backed up having a high priority. When detecting that the application data to be backed up is completely transmitted, the terminal may transmit the application data to be backed up having a low priority. The act of transmitting the application data to be backed up to a server according to the backup priorities in block S204 may include the followings.

At block S2041, the application data to be backed up corresponding to a current priority is transmitted to the server.

At block S2042, it is detected whether the application data to be backed up corresponding to the current priority is transmitted completely.

At block S2043, when the application data to be backed up corresponding to the current priority is transmitted completely, the application data to be backed up corresponding to a next priority is transmitted to the server. The current priority is higher than the next priority.

For example, the terminal transmits the application data to be backed up having a highest priority to the server and detects whether the application data to be backed up having the highest priority is transmitted completely. When detecting the application data to be backed up having the highest priority is transmitted completely, the terminal transmits the application data to be backed up having a second priority to the server. In some embodiments, the application data to be backed up corresponding to priorities lower than the second priority can be transmitted in this way, which is not described herein.

In order to enable the terminal to know a backup situation of the application data to be backed up when the transmission is interrupted, the terminal may further detect a network connection situation of the terminal when the application data to be backed up is not transmitted completely. When there is no network connection, it is recorded whether the backup is finished and a backup proportion. The above method further include the followings.

At block S2044, when the application data to be backed up corresponding to the current priority is not transmitted completely, it is detected whether a current network connection state of the terminal is in a disconnection state.

For example, when the terminal detects that the application data to be backed up with the highest priority is not transmitted completely, the terminal detects whether the current network connection state is in the disconnection state, i.e., the terminal detects whether there is no network connection. When the terminal detects that there is no network connection, an act at block S2045 is executed, when the terminal detects that there is the network connection, an act at block S2042 is executed.

At block S2045, when detecting that the current network connection state of the terminal is in the disconnection state, it is recorded backup progress information of the application data to be backed up corresponding to the current priority.

For example, when the terminal detects that there is no network connection, the terminal records whether the application data to be backed up corresponding to the highest priority is transmitted completely and a backup proportion. In some embodiments, during a transmission of the application data to be backed up with other priorities, when the terminal detects that the application data to be backed up with other priorities is not transmitted completely, the backup progress information can be recorded in the way described above.

In detail, the terminal may acquire an initial amount of the application data to be backed up corresponding to the current priority and a backup amount of the application data to be backed up corresponding to the current priority, and calculate a ratio of the backup amount to the initial amount, so as to acquire the backup proportion.

With the data backup method according to the embodiments of the present disclosure, application data to be backed up and update frequencies of the application data in a terminal are acquired, the update frequencies are ranked according to a predetermined rule, the backup priorities are determined according to the ranked update frequencies and the application data to be backed up is transmitted to a server according to the backup priorities. Since the update frequencies are ranked from higher to lower and the application data to be backed up is backed up according to a ranked result, the data frequently used by the user can be backed up in real time, such that synchronization efficiencies of other terminals can be improved when the user synchronizes data on these terminals, thus bringing conveniences to the user.

Figure 3:
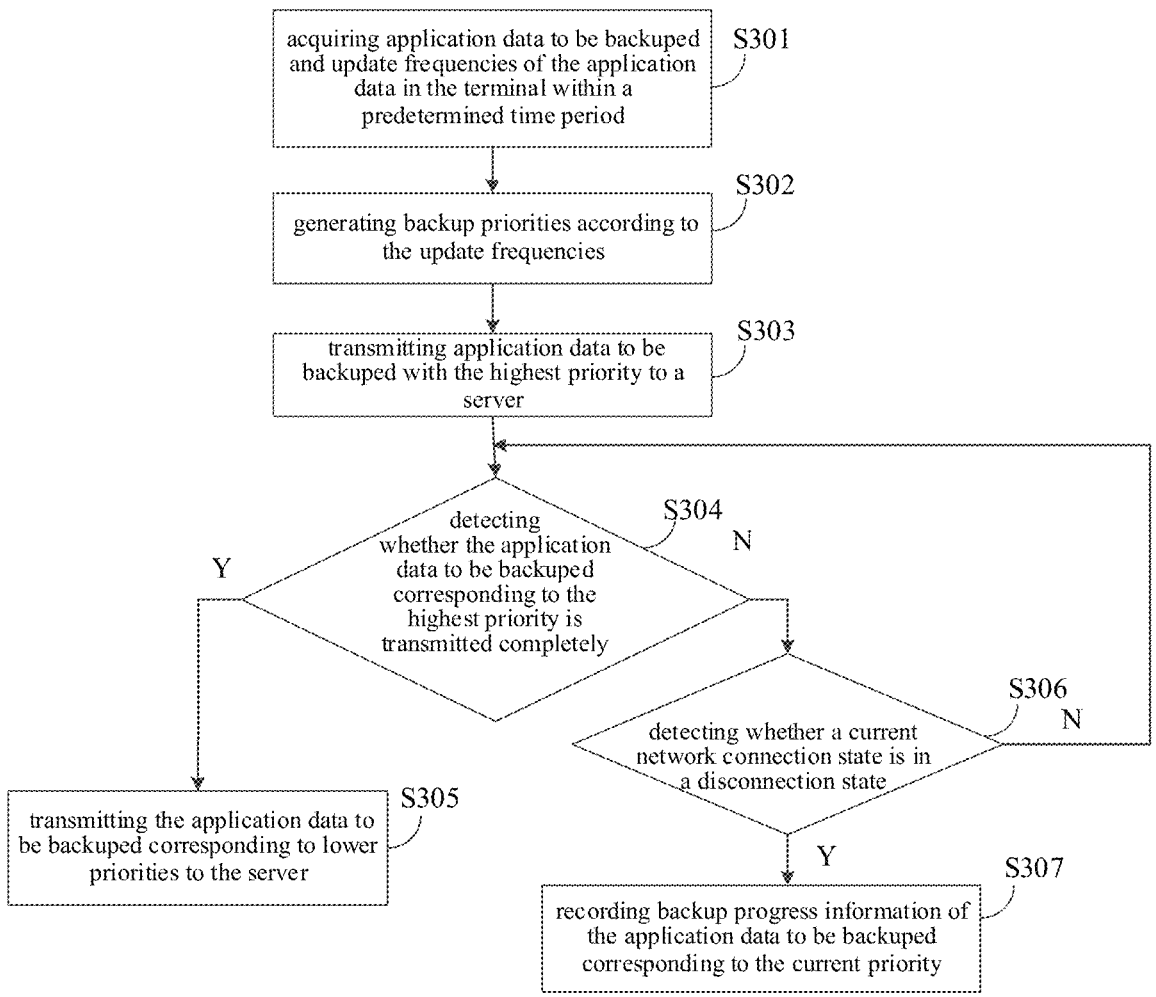
FIG. 3 is a flow chart of a data backup method according to a still embodiment of the present disclosure.

As illustrated in FIG. 3, FIG. 3 is a flow chart of a data backup method according to a still embodiment of the present disclosure.

The data backup method according to the embodiment may include the followings.

At block S301, application data to be backed up and update frequencies of the application data of in a terminal within a predetermined time period are acquired.

For example, take data backup of a photo application, an address book application and so on as an example. The terminal acquires the data update counts of the photo application and the address book application in one day. For example, the data update count of the photo application is 5, the data update count of the address book application is 1. After the calculation, the update frequency of the photo application is 5 times/day and the update frequency of the address book application is 1 time/day. The terminal further acquires the data to be baked-up of the photo application and the address book application within one day. In order to avoid data lost, the terminal may further acquire incremental data of the photo application and the address book application respectively, and the update frequencies of the incremental data of the photo application and the address book application.

At block S302, backup priorities are generated according to the update frequencies.

For example, since the update frequency of the photo application is greater than that of the address book application, the terminal may rank the update frequencies from higher to lower, such that the ranked update frequencies are listed as 5 and 1. The ranked result of the update frequencies corresponds to the usage frequencies of the applications. The applications ranked according to usage frequencies from higher to lower can be listed as the photo application and the address book application. Thus, the backup priorities of the application data acquired by the terminal may indicate that the data of the photo application is backed up firstly and then the data of the address book application is backed up.

At block S303, application data to be backed up with the highest priority is transmitted to a server.

For example, the terminal transmits the data to be backed up of the photo application to the server and backs up the data of the photo application.

At block S304, it is detected whether the application data to be backed up corresponding to the highest priority is transmitted completely.

For example, the terminal detects the data to be backed up of the photo application is transmitted completely. When the terminal detects that the data to be backed up of the photo application is transmitted completely, an act at block S305 is executed, otherwise an act at block S306 is executed.

At block S305, when the application data to be backed up corresponding to the highest priority is transmitted completely, application data to be backed up corresponding to lower priorities is transmitted to the server.

For example, when the terminal detects that the data to be backed up of the photo application is transmitted completely, the terminal continues transmitting the data to be backed up of the address book application to the server, so as to back up the data of the address book application.

At block S306, when the application data to be backed up corresponding to the lower priorities is not transmitted completely, it is detected whether a current network connection state is in a disconnection state.

For example, when the terminal detects that the data to be backed up of the photo application is not transmitted completely, the terminal may detect whether the current network connection state is in the disconnection state. When the terminal detects that the current network connection state is in the disconnection state, the terminal may execute an act at block S307. When the terminal detects that the current network connection state is in a connection state, the terminal may execute an act at block S304.

At block S307, when it is detected that the network connection state of the terminal is in the disconnection state, backup progress information of the application data to be backed up corresponding to the current priority is recorded.

For example, when the terminal detects the current network connection state is in the disconnection state, a ratio of backed up data to the data to be backed up of the photo application is recorded. In some embodiments, when the terminal detects that the current network connection state is restored to the connection state, the terminal continues transmitting the data to be backed up of the photo application to the server.

In some embodiments, during a transmission of the data to be backed up of the address book application, when the terminal detects that the current network connection state is in the disconnection state, the terminal further records the backup progress information of the data to be backed up of the address book application.

With the data backup method according to the embodiments of the present disclosure, application data to be backed up and update frequencies of the application data in a terminal within a predetermined time period are acquired. The backup priorities are generated according to the update frequencies. The application data to be backed up corresponding to the highest priority is transmitted to a server. It is detected whether the application data to be backed up corresponding to the highest priority is transmitted completely. If the application data to be backed up corresponding to the highest priority is transmitted completely, the application data to be backed up with lower priorities is transmitted to the server. If the application data to be backed up corresponding to the highest priority is not transmitted completely, the terminal detects whether the current network connection state is in the disconnection state. When the network connection state of the terminal is detected as the disconnection state, the backup progress information of the application data to be backed up corresponding to the current priority is recorded. Since it is further detected whether the transmission is finished during the transmission, when the transmission is not finished and there is no network connection, backup proportion is recorded, such that malfunction of the terminal can be avoided, thus improving accuracy of backup.

Embodiments of the present disclosure further provide a data backup apparatus. The data backup apparatus includes an acquiring module, a priority generating module and a transmitting module.

The acquiring module is configured to acquire application data to be backed up and update frequencies of the application data in a terminal.

The priority generating module is configured to generate backup priorities according to the update frequencies.

The transmitting module is configured to transmit the application data to be backed up to a server based on the backup priorities.

In some embodiments, the transmitting module includes a first transmitting sub-module, a transmission detecting sub-module and a second transmitting sub-module.

The first transmitting sub-module is configured to transmit the application data to be backed up corresponding to a current priority to the server.

The transmission detecting sub-module is configured to detect whether the application data to be backed up corresponding to the current priority is completely transmitted.

The second transmitting sub-module is configured to transmit the application data to be backed up corresponding to a next priority to the server, in response to detecting that the application data to be backed up corresponding to the current priority is completely transmitted.

In some embodiments, the transmitting module further includes a network detection sub-module and a recording sub-module.

The network detection sub-module is configured to detect whether a current network connection state of the terminal is in a disconnection state in response to detecting that the application data to be backed up corresponding to the current priority is not completely transmitted.

The recording sub-module is configured to record backup progress information of the application data to be backed up corresponding to the current priority, in response to detecting that the current network connection state of the terminal is in the disconnection state.

In some embodiments, the priority generating module includes a ranking sub-module and a determining sub-module.

The ranking sub-module is configured to rank the update frequencies according to a predetermined rule.

The determining sub-module is configured to determine the backup priorities of the applications in the terminal according to ranked update frequencies.

In some embodiments, the acquiring module is further configured to: acquire initial application data of an application in the terminal; acquire current application data of the application after detecting a change of the initial application data of the application in the terminal; and acquire the application data to be backed up based on the initial application data and the current application data.

In some embodiments, the acquiring module is further configured to acquire difference between the initial application data and the current application data and determining the difference between the initial application data and the current application data as the application data to be backed up.

Figure 4:
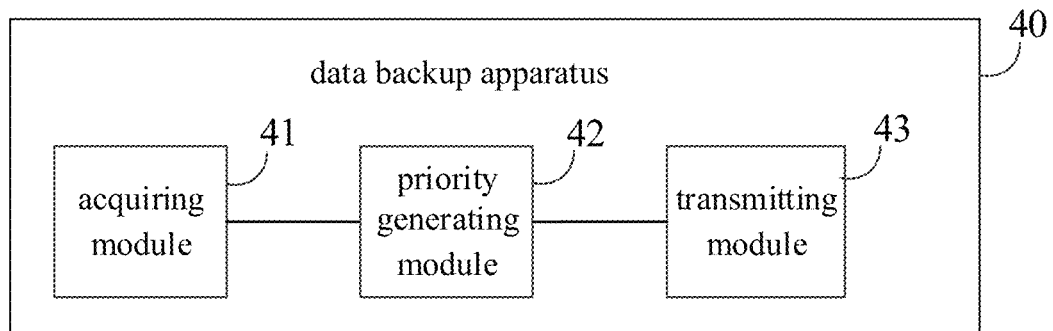
FIG. 4 is a block diagram of a data backup apparatus according to an embodiment of the present disclosure.

As illustrated in FIG. 4, FIG. 4 is a block diagram of a data backup apparatus according to an embodiment of the present disclosure. The data backup apparatus 40 according to the embodiment of the present disclosure includes an acquiring module 41, a priority generating module 42 and a transmitting module 43.

The acquiring module 41 is configured to acquire application data to be backed up and update frequencies of the application data in the terminal.

For example, the terminal is provided with a plurality of applications, such as a photo application, an address book application and so on. The terminal acquires the update frequency of application data and application data to be backed up of each application. For example, the terminal acquires the update frequency within a certain time period.

The applications may be applications to be backed up specified by a user. For example, if the user sets the terminal in advance to merely back up some applications, the terminal may merely acquire the update frequencies and the application data to be backed up of these applications.

In some embodiments, the data to be backed up of an application may be acquired as follows. The terminal acquires initial application data of the application. When detecting a change of the initial application data of the application, the terminal acquires current application data of the application, acquires difference between the current application data and the initial application data, and determines the difference between the current application data and the initial application data as the application data to be backed up. In an embodiment, if the current application data is greater than the initial application data, the difference between the current application data and the initial application data is determined as the application data to be backed up, i.e., the application data to be backed up is determined as incremental data.

The priority generating module 42 is configured to generate backup priorities according to the update frequencies.

For example, the terminal acquires a sequence of backing up the application data (i.e., backup priorities) according to the update frequencies of the application data. For example, the terminal ranks the update frequencies from higher to lower or from lower to higher. The update frequency of the application data decides a usage frequency (i.e., user attention-degree) of the application data.

Although the user sets the terminal in advance to merely back up some applications, the terminal may acquire a sequence of backing up these applications according to the update frequencies of these applications.

In some embodiments, the terminal may also generate the backup priorities in other ways. For example, the terminal acquires a data change of the terminal within a certain time period, and generates the backup priorities of the data change and the update frequencies. In detail, the terminal may store an association table with correspondence between data changes, update frequencies and backup priorities, and acquire the backup priorities by querying the association table.

The transmitting module 43 is configured to transmit the application data to be backed up to a server according to the backup priorities.

For example, the terminal transmits the application data to be backed up to the server according to the sequence of backing up the application data, and the server stores the application data to be backed up.

Figure 5:
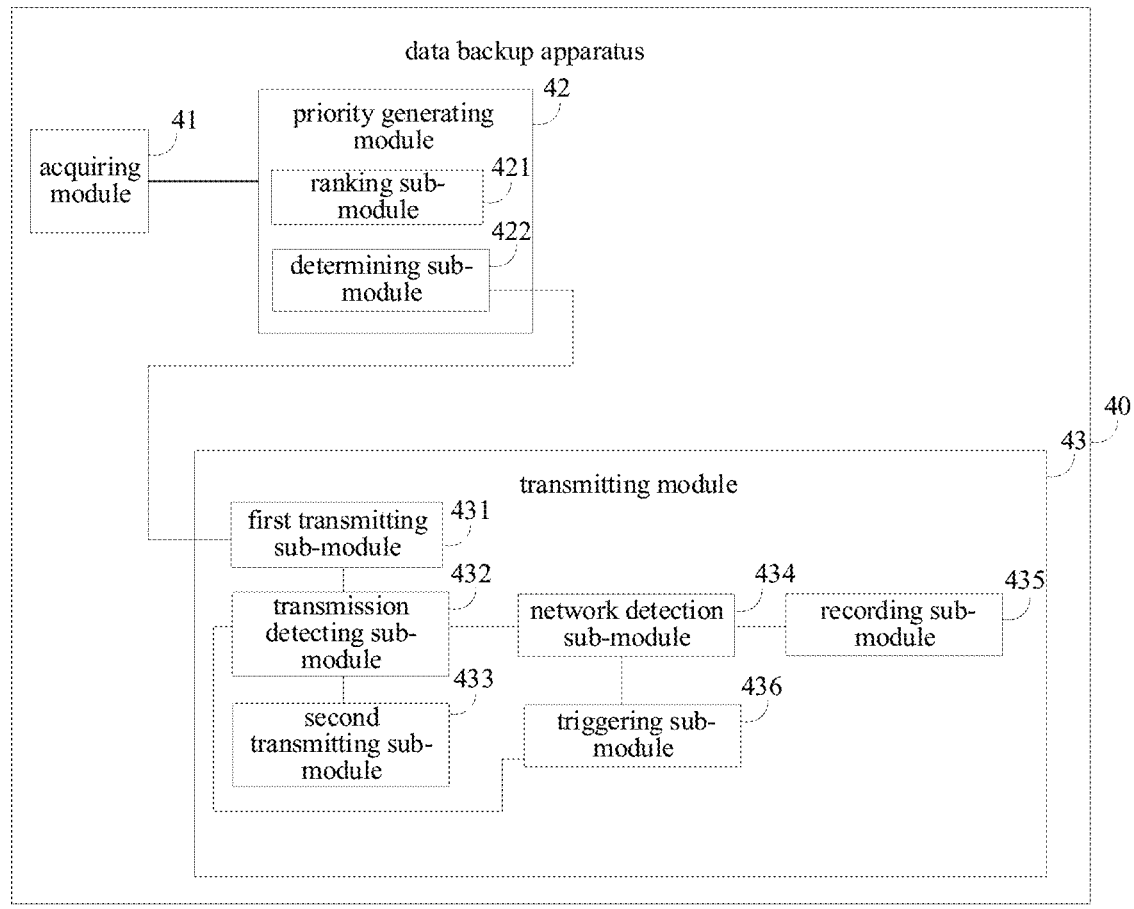
FIG. 5 is a block diagram of a data backup apparatus according to another embodiment of the present disclosure.

As illustrated in FIG. 5, the transmitting module 43 includes a first transmitting sub-module 431, a transmission detecting sub-module 432 and a second transmitting sub-module 433.

The first transmitting sub-module 431 is configured to transmit the application data to be backed up corresponding to a current priority to the server.

The transmission detecting sub-module 432 is configured to detect whether the application data to be backed up corresponding to the current priority is completely transmitted.

The second transmitting sub-module 433 is configured to transmit the application data to be backed up corresponding to a next priority to the server, in response to detecting that the application data to be backed up corresponding to the current priority is completely transmitted. The current priority is higher than the next priority.

For example, the terminal transmits the application data to be backed up having a highest priority to the server and detects whether the application data to be backed up having the highest priority is transmitted completely. When detecting the application data to be backed up having the highest priority is transmitted completely, the terminal transmits the application data to be backed up having a second priority to the server. In some embodiments, the applications data to be backed up corresponding to priorities lower than the second priority can be transmitted in this way, which is not described herein.

The transmitting module 43 further includes a network detection sub-module 434, a recording sub-module 435 and a triggering sub-module 436.

The network detection sub-module 434 is configured to detect whether a current network connection state of the terminal is in a disconnection state in response to detecting that the application data to be backed up corresponding to the current priority is not completely transmitted.

For example, when the terminal detects that the application data to be backed up with the highest priority is not transmitted completely, the terminal detects whether the current network connection state is in the disconnection state, i.e., the terminal detects whether there is no network connection.

The recording sub-module 435 is configured to record backup progress information of the application data to be backed up corresponding to the current priority, in response to detecting that the current network connection state of the terminal is in the disconnection state.

For example, when the terminal detects that there is no network connection, the terminal records whether the application data to be backed up corresponding to the highest priority is transmitted completely and a backup proportion. In some embodiments, during a transmission of the application data to be backed up with other priorities, when the terminal detects that the application data to be backed up with other priorities is not transmitted completely, the backup progress information can be recorded in the way described above.

In detail, the terminal may acquire an initial amount of the application data to be backed up corresponding to the current priority and a backup amount of the application data to be backed up corresponding to the current priority, and calculate a ratio of the backup amount to the initial amount, so as to acquire the backup proportion.

The trigger sub-module 436 is configured to trigger the transmission detecting sub-module 432 to perform detecting whether the application data to be backed up corresponding to the current priority is completely transmitted in response to detecting that the current network connection state of the terminal is not in the disconnection state.

For example, when the terminal detects that there is the network connection, the terminal may perform detecting whether the application data to be backed up corresponding to the current priority is transmitted completely.

The priority generating module 42 includes a ranking sub-module 421 and a determining sub-module 422.

The ranking sub-module 421 is configured to rank the update frequencies according to a predetermined rule.

For example, the terminal acquires a sequence of backing up the application data (i.e., backup priorities) according to the update frequencies of the application data. For example, the terminal ranks the update frequencies from higher to lower or from lower to higher. The update frequency of the application data decides a usage frequency or a user attention-degree of the application data. The higher the update frequency is, the higher the user attention-degree is.

Although the user sets the terminal in advance to merely back up some applications, the terminal may rank the update frequencies of these applications from higher to lower.

The determining sub-module 422 is configured to determine the backup priorities according to ranked update frequencies.

For example, the terminal acquires the backup priorities of the application data according to the update frequencies ranked from higher to lower. The terminal may back up the application data to be backed up having a high update frequency, and back up the application data to be backed up having a low update frequency.

In addition, each module in the present disclosure may be implemented as independent entity, or in any combination, or as one or more entities. The specific implementation of each module can refer to the aforementioned method embodiments, which is not described herein.

With the data backup apparatus according to the embodiments of the present disclosure, application data to be backed up and update frequencies of the application data in a terminal are acquired, backup priorities are generated according to the update frequencies and the application data to be backed up is transmitted to a server according to the backup priorities. Since the data backup frequency of application data is acquired and the backup priorities of the application data are determined according to the data backup frequency, the application data having higher user attention-degree can be backed up in real time, such that timeliness and flexibility of backup can be improved.

Embodiments of the present disclosure further provide an electronic device. The electronic device includes a processor and a memory. The processor and the memory are coupled electrically. The memory is configured to store instructions and data. The processor is configured to perform: acquiring application data to be backed up and update frequencies of the application data in the terminal; generating backup priorities based on the update frequencies; and transmitting the application data to be backed up to a server based on the backup priorities.

In some embodiments, when transmitting the application data to be backed up to the server based on the backup priorities, the processor is configured to perform: transmitting the application data to be backed up corresponding to a current priority to the server; detecting whether the application data to be backed up corresponding to the current priority is completely transmitted; and transmitting the application data to be backed up corresponding to a next priority to the server, in response to detecting that the application data to be backed up corresponding to the current priority is completely transmitted, the current priority being higher than the next priority.

In some embodiments, in response to detecting that the application data to be backed up corresponding to the current priority is not completely transmitted, the processor is further configured to perform: detecting whether a current network connection state of the terminal is in a disconnection state; and recording backup progress information of the application data to be backed up corresponding to the current priority, in response to detecting that the current network connection state of the terminal is in the disconnection state.

In some embodiments, the processor is further configured to perform: continuing to detect whether the application data to be backed up corresponding to the current priority is completely transmitted, in response to detecting that the current network connection state of the terminal is not in the disconnection state.

In some embodiments, when generating the backup priorities according to the update frequencies, the processor is configured to perform: ranking the update frequencies according to a predetermined rule; and determining the backup priorities of the applications in the terminal according to ranked update frequencies.

Figure 6:
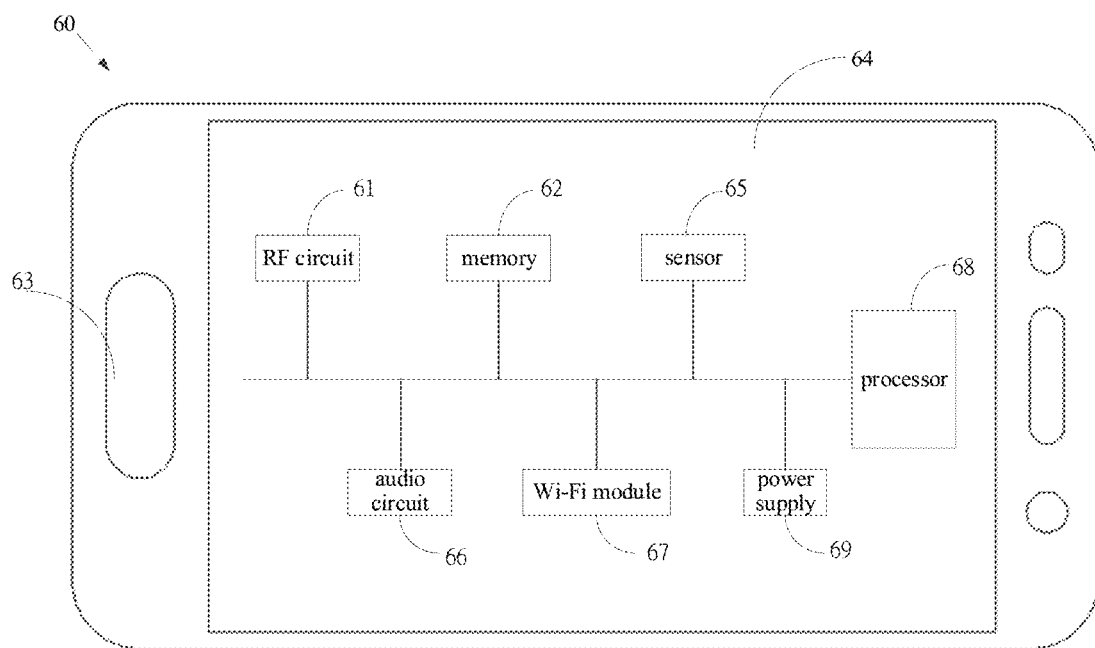
FIG. 6 is a block diagram of a terminal according to an embodiment of the present disclosure.

As illustrated in FIG. 6, FIG. 6 is a block diagram of a terminal according to an embodiment of the present disclosure.

Embodiments of the present disclosure provide a terminal. The terminal may include the aforementioned data backup apparatus. Regarding the data backup apparatus, reference can be made to the above embodiments, which is not described herein.

Embodiments of the present disclosure further provide an electronic device. The electronic device may be a terminal, such as a smart phone, a tablet computer or the like. As illustrated in FIG. 6, the electronic device 60 may include a radio frequency (RF) circuit 61, a memory 62 including one or more computer-readable storage mediums, an input unit 63, a display unit 64, a sensor 65, an audio circuit 66, a wireless fidelity (Wi-Fi) module 67, a processor 68 including one or more processing cores, a power supply 69 and other components. It will be understood by those skilled in the art that the structure of the electronic device illustrated in FIG. 6 does not constitute a limitation to the electronic device, and may include more or less components than those illustrated, or some components may be combined, or the components may be arranged differently.

The RF circuit 61 may be configured to receive and transmit signals during a process of transmitting and receiving a message or making a call. The RF circuit 61 may be configured to receive downlink data from a base station and to transmit the downlink data to one or more processors 68. Alternatively, the RF circuit 61 may be configured to transmit uplink data to the base station. In general, the RF circuit 61 includes but is not limited to an antenna, at least one amplifier, a turner, one or more oscillators, a subscriber identity module (SIM) card, a transceiver, a coupler, a low noise amplifier (LNA), a diplexer and the like. Furthermore, the RF circuit 61 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 62 may be configured to store software programs or modules. The processor 68 is configured to execute various functional applications and data processes of the mobile phone by running the software programs and modules stored in the memory 62. The memory 62 may mainly include a program storage region and a data storage region. The program storage region may store an operating system, at least one function required application (such as an application having a sound playing function, an application having an image playing function) and the like. The data storage region may store data produced by using the mobile phone (such as audio data, an address book) and the like. In addition, the memory 62 may include a high speed random access memory and may include a non-volatility memory, such as at least one disk memory, a flash memory, or other volatility solid state memory. Accordingly, the memory 62 may further include a memory controller providing access to the memory 62 for the processor 68 and the input unit 63.

The input unit 63 may be configured to receive figure or character information inputted and generate a key signal input, a mouse signal input, an operating level signal input, an optical signal input or a trackball signal input related to a user setup or function control. In detail, the input unit 63 may include a touch panel and other input devices. The touch panel (also called as touch screen or touchpad) may be configured to gather touch operations near or on the touch panel (such as an operation on the touch panel or near the touch panel of the user with a finger, a stylus or other suitable objects or attachments), and drive corresponding coupled device according to a preset program. In an embodiment, the touch panel may include a touch detection device and a touch controller. The touch detection device detects an orientation of the user's touch, detects a signal caused by the touch operation and sends the signal to the touch controller. The touch controller receives the touch information from the touch detection device, converts the touch information to touch point coordinates, and sends the touch point coordinates to the processor 68. Furthermore, the touch controller may receive and execute a command sent from the processor 68. The touch panel may be implemented as a resistive type, a capacitive type, an infrared type and a surface acoustic wave type touch panel. In addition to the touch panel, the input unit 63 may further include other input devices. In detail, the other input devices may include but are not limited to one or more of a physical keyboard, a functional key (such as a volume control key, a switch key and the like), a trackball, a mouse, an operating level.

The display unit 64 may be configured to display information inputted by the user or information provided to the user, and various graphic user interfaces of the terminal. The graphic user interfaces may be formed by graphic, text, icons, videos or any combination thereof. The display unit 64 may include a display panel. In an embodiment, the display panel may be configured as a liquid crystal display (LCD), an organic light-emitting diode (OLED) and the like. In an embodiment, the touch panel may cover the display panel. When the touch panel detects the touch operation on the touch panel or near the touch panel, the touch operation is transmitted to the processor 68 to determine a type of the touch event. Thereafter, the processor 68 provides a corresponding visual output on the display panel according to the type of the touch event. Although the touch panel and the display panel are two separate components in FIG. 6 to realize an input and output function of the terminal, in certain embodiments, the touch panel and the display panel may be integrated to realize the input and output function of the terminal.

The electronic device 60 may further include at least one sensor 65, such as an optical sensor, a motion sensor and other sensors. In detail, the optical sensor may include a surrounding light sensor and a proximity sensor. The surrounding light sensor may adjust a brightness of the display panel according to surrounding lights. The proximity sensor may close the display panel and/or backlight when the mobile phone moves near ears of the user. The motion sensor may include an acceleration sensor. By the acceleration sensor, the acceleration values in various directions (typically three-axis) can be measured, and a magnitude and a direction of gravity can be measured when the terminal is static. The acceleration sensor can be used in identifying a posture of the mobile phone (such as landscape/portrait screen switching), vibration recognition related functions (such as a pedometer, a knocking) and the like. Furthermore, the terminal may be configured with a gyroscope, a barometer, a hygrometer, a thermometer, an infrared sensor and other sensors, which is not described herein.

The audio circuit 66, a loudspeaker and a microphone may provide an audio interface between the user and the mobile phone. The audio circuit 66 may receive audio data, convert the audio data to an electrical signal, and transmit the electrical signal to the loudspeaker. The loudspeaker converts the electrical signal to a sound signal and output the sound signal. In another aspect, the microphone may convert gathered sound signals to electrical signals. The audio circuit 66 receives and converts the electrical signals to audio data and outputs the audio data to the processor 68 for processing. The audio data processed by the processor 68 may be transmitted to another mobile phone via the RF circuit 61 or may be stored in the memory 62 for further processing. The audio circuit 66 may further includes an earplug jack for providing communication between a peripheral earphone and the terminal.

Wi-Fi is a short distance wireless communication technology. The terminal may help the user to receive or send an e-mail, browse webpages, access to stream medium via the Wi-Fi module 67. The Wi-Fi module 67 provides wireless broadband Internet access service to the user. Although the Wi-Fi module 67 is illustrated in FIG. 6, it may be understood that, the Wi-Fi module 67 is not essential for the terminal, thus it may be omitted according to demands without changing the nature of the present disclosure.

The processor 68 is a control center of the terminal, which utilizes various interfaces and wires to couple various parts of the terminal. By running or executing the software program and/or modules stored in the memory 62, and by invoking data stored in the memory 62, the various functions and data processing functions may be executed, thus integrally monitoring the terminal. In an embodiment, the processor 68 may include one or more processing cores. In an embodiment, the processor 68 may be integrated with an application processor and a modem processor. The application processor mainly processes the operating system, a user interface and an application. The modem processor mainly processes wireless communication. It may be understood that, the above modem processor may be not integrated in the processor 68.

The electronic device 60 may further include a power supply 69 (such as a battery) for providing power to various components of the terminal. Preferably, the power supply may be logically coupled to the processor 68 via a power management system, thereby managing charging, discharging and power consumption via the power management system. The power supply 69 may include one or more direct-current or alternating-current power supplies, a rechargeable system, a power supply fault detection circuit, a power converter or inverter, a power supply state indicator or other components.

Although not illustrated, the electronic device 60 may further include a camera, a Bluetooth module and the like, which is not described herein.

In an embodiment, the processor 68 in the electronic device may load executable documents corresponding to processes of one or more applications into the memory 62 according to instructions, such that the processor 68 executes the application stored in the memory 62 to perform: acquiring application data to be backed up and update frequencies of the application data in the terminal; generating backup priorities based on the update frequencies; and transmitting the application data to be backed up to a server based on the backup priorities.

The processor 68 includes an acquiring module, a priority generating module and a transmitting module.

The acquiring module is configured to acquire application data to be backed up and update frequencies of the application data in a terminal.

The priority generating module is configured to generate backup priorities according to the update frequencies.

The transmitting module is configured to transmit the application data to be backed up to a server based on the backup priorities.

In some embodiments, when transmitting the application data to be backed up to the server based on the backup priorities, the processor 68 is configured to perform: transmitting the application data to be backed up corresponding to a current priority to the server; detecting whether the application data to be backed up corresponding to the current priority is completely transmitted; and transmitting the application data to be backed up corresponding to a next priority to the server, in response to detecting that the application data to be backed up corresponding to the current priority is completely transmitted, the current priority being higher than the next priority.

In some embodiments, in response to detecting that the application data to be backed up corresponding to the current priority is not completely transmitted, the processor 68 is further configured to perform: detecting whether a current network connection state of the terminal is in a disconnection state; and recording backup progress information of the application data to be backed up corresponding to the current priority, in response to detecting that the current network connection state of the terminal is in the disconnection state.

In some embodiments, the processor 68 is further configured to perform: continuing to detect whether the application data to be backed up corresponding to the current priority is completely transmitted, in response to detecting that the current network connection state of the terminal is not in the disconnection state.

In some embodiments, when generating the backup priorities according to the update frequencies, the processor is configured to perform: ranking the update frequencies according to a predetermined rule; and determining the backup priorities of the applications in the terminal according to ranked update frequencies.

With the electronic device according to the embodiments of the present disclosure, application data to be backed up and update frequencies of the application data in a terminal are acquired, backup priorities are generated according to the update frequencies and the application data to be backed up is transmitted to a server according to the backup priorities. Since the backup frequency of application data is acquired and the backup priorities of the application data are determined according to the backup frequency, the application data having higher user attention-degree can be backed up in real time, such that timeliness and flexibility of backup can be improved.

Embodiments of the present disclosure further provide a storage medium. The storage medium stores a plurality of instructions. The plurality of instructions are suitable to be loaded by a processor, such that the processor is caused to perform the data backup method according to any of embodiments of the present disclosure.

Figure 7:
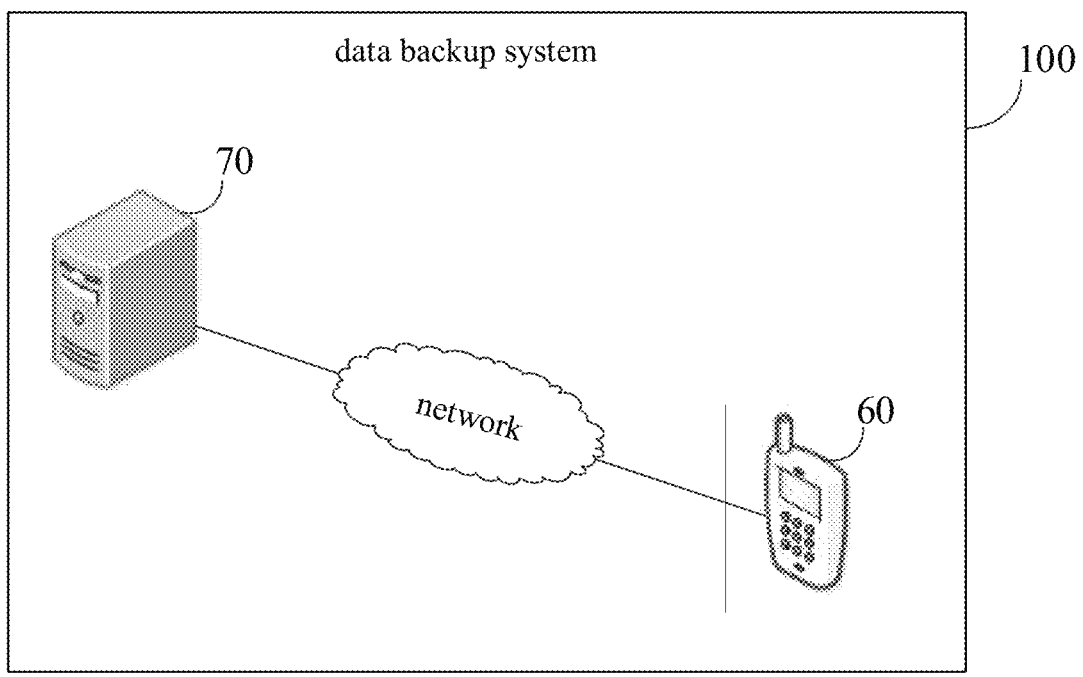
FIG. 7 is a diagram of a data backup system according to an embodiment of the present disclosure.

As illustrated in FIG. 7, the present disclosure further provides a data backup system 100. The data backup system 100 includes a server 70, at least one terminal 60. The terminal 60 may include the data backup apparatus according to any of embodiments described above. The terminal may be a tablet computer, a mobile phone or the like.

It should be understood that, regarding the structure and function of the data backup apparatus, reference can be made to the above description, which is not described herein.

It should be noted that, those skilled in the art shall understand that all or parts of the steps in the above data backup method of the present disclosure may be achieved by commanding the related hardware with programs. The programs may be stored in a computer readable storage medium. The storage medium may include a Read-Only Memory (ROM), a Random Access Memory (RAM), a disc, or an optical disk.

The data backup method, the data backup apparatus, the electronic device, the storage medium and the system according embodiments of the present disclosure have been described above. The forgoing description is only directed to the principle and implementation of the present disclosure. It should be understood that above embodiments are just explanatory, and cannot be construed to limit the present disclosure, for those skilled in the art, changes, alternatives, and modifications can be made to the embodiments without departing from spirit, principles and scope of the present disclosure. In conclusion, the specification cannot be construed to limit the present disclosure.

What is claimed is:

1. A data backup method in a terminal, comprising:
acquiring application data to be backed up and update frequencies and data changes of the application data in the terminal;
generating backup priorities based on the update frequencies and data changes by querying an association table with correspondence between data changes, update frequencies and backup priorities; and
transmitting the application data to be backed up to a server based on the backup priorities;
wherein transmitting the application data to be backed up to the server based on the backup priorities comprises:
transmitting the application data to be backed up corresponding to a current priority to the server;
detecting whether the application data to be backed up corresponding to the current priority is completely transmitted; and
transmitting the application data to be backed up corresponding to a next priority to the server, in response to detecting that the application data to be backed up corresponding to the current priority is completely transmitted, wherein the current priority is higher than the next priority;
wherein, in response to detecting that the application data to be backed up corresponding to the current priority is not completely transmitted, the method further comprises:
detecting whether a current network connection state of the terminal is in a disconnection state; and
recording backup progress information of the application data to be backed up corresponding to the current priority, in response to detecting that the current network connection state of the terminal is in the disconnection state;
wherein recording the backup progress information of the application data to be backed up corresponding to the current priority comprises:
acquiring an initial amount of the application data to be backed up corresponding to the current priority and a backup amount of the application data to be backed up corresponding to the current priority;
calculating a ratio of the backup amount to the initial amount to acquire a backup proportion; and
recording the backup proportion as the backup progress information.

2. The method of claim 1, further comprising:
continuing to detect whether the application data to be backed up corresponding to the current priority is completely transmitted, in response to detecting that the current network connection state of the terminal is not in the disconnection state.

3. The method of claim 1, wherein, generating the backup priorities based on the update frequencies comprises:
ranking the update frequencies based on a predetermined rule; and
determining the backup priorities based on ranked update frequencies.

4. The method of claim 1, wherein, acquiring the application data to be backed up comprises:
acquiring initial application data of an application in the terminal;
acquiring current application data of the application after detecting a change of the initial application data of the application in the terminal; and
acquiring the application data to be backed up based on the initial application data and the current application data.

5. The method of claim 4, wherein, acquiring the application data to be backed up based on the initial application data and the current application data comprises:
acquiring difference between the initial application data and the current application data and determining the difference between the initial application data and the current application data as the application data to be backed up.

6. The method of claim 1, wherein acquiring the update frequencies of the application data comprises:
acquiring an update count of the application data of an application within a predetermined time period; and
dividing the update count by the predetermined time period to acquire the update frequency of the application data of the application.

7. The method of claim 1, wherein generating the backup priorities based on the update frequencies comprises:
acquiring a change amount of the application data of an application within a predetermined time period; and
generating the backup priority of the application data based on the change amount and the update frequency of the application data of the application.

8. A non-transitory computer-readable storage medium, having a plurality of instructions stored therein, wherein the plurality of instructions are suitable to be loaded by a processor, so as to cause the processor to perform a data backup method in a terminal comprising:
acquiring application data to be backed up and update frequencies and data changes of the application data in the terminal;
generating backup priorities based on the update frequencies and data changes by querying an association table with correspondence between data changes, update frequencies and backup priorities; and
transmitting the application data to be backed up to a server based on the backup priorities;
wherein transmitting the application data to be backed up to the server based on the backup priorities comprises:
transmitting the application data to be backed up corresponding to a current priority to the server;
detecting whether the application data to be backed up corresponding to the current priority is completely transmitted; and
transmitting the application data to be backed up corresponding to a next priority to the server, in response to detecting that the application data to be backed up corresponding to the current priority is completely transmitted, wherein the current priority is higher than the next priority;
wherein, in response to detecting that the application data to be backed up corresponding to the current priority is not completely transmitted, the method further comprises:
detecting whether a current network connection state of the terminal is in a disconnection state; and
recording backup progress information of the application data to be backed up corresponding to the current priority, in response to detecting that the current network connection state of the terminal is in the disconnection state;

wherein recording the backup progress information of the application data to be backed up corresponding to the current priority comprises:
  acquiring an initial amount of the application data to be backed up corresponding to the current priority and a backup amount of the application data to be backed up corresponding to the current priority;
  calculating a ratio of the backup amount to the initial amount to acquire a backup proportion; and
  recording the backup proportion as the backup progress information.

9. An electronic device, comprising a processor and a memory, wherein the processor is coupled to the memory electrically, the memory is configured to store instructions and data, the processor is configured to perform:
  acquiring application data to be backed up and update frequencies and data changes of the application data in the electronic device;
  generating backup priorities based on the update frequencies and data changes by querying an association table with correspondence between data changes, update frequencies and backup priorities; and
  transmitting the application data to be backed up to a server based on the backup priorities;
  wherein transmitting the application data to be backed up to the server based on the backup priorities comprises:
    transmitting the application data to be backed up corresponding to a current priority to the server;
    detecting whether the application data to be backed up corresponding to the current priority is completely transmitted; and
    transmitting the application data to be backed up corresponding to a next priority to the server, in response to detecting that the application data to be backed up corresponding to the current priority is completely transmitted, wherein the current priority is higher than the next priority;
  wherein, in response to detecting that the application data to be backed up corresponding to the current priority is not completely transmitted, the processor is further configured to perform:
    detecting whether a current network connection state of the electronic device is in a disconnection state; and
    recording backup progress information of the application data to be backed up corresponding to the current priority, in response to detecting that the current network connection state of the electronic device is in the disconnection state;
  wherein recording the backup progress information of the application data to be backed up corresponding to the current priority comprises:
    acquiring an initial amount of the application data to be backed up corresponding to the current priority and a backup amount of the application data to be backed up corresponding to the current priority;
    calculating a ratio of the backup amount to the initial amount to acquire a backup proportion; and
    recording the backup proportion as the backup progress information.

10. The electronic device of claim 9, wherein transmitting the application data to be backed up to the server based on the backup priorities comprises:
  transmitting the application data to be backed up corresponding to a current priority to the server;
  detecting whether the application data to be backed up corresponding to the current priority is completely transmitted; and
  transmitting the application data to be backed up corresponding to a next priority to the server, in response to detecting that the application data to be backed up corresponding to the current priority is completely transmitted,
  wherein the current priority is higher than the next priority.

11. The electronic device of claim 10, wherein in response to detecting that the application data to be backed up corresponding to the current priority is not completely transmitted, the processor is further configured to perform:
  detecting whether a current network connection state of the electronic device is in a disconnection state; and
  recording backup progress information of the application data to be backed up corresponding to the current priority, in response to detecting that the current network connection state of the electronic device is in the disconnection state.

12. The electronic device of claim 11, wherein the processor is further configured to perform:
  continuing to detect whether the application data to be backed up corresponding to the current priority is completely transmitted, in response to detecting that the current network connection state of the electronic device is not in the disconnection state.

13. The electronic device of claim 9, wherein generating the backup priorities based on the update frequencies comprises:
  ranking the update frequencies based on a predetermined rule; and
  determining the backup priorities based on ranked update frequencies.

14. The electronic device of claim 9, wherein, acquiring the application data to be backed up comprises:
  acquiring initial application data of an application in the electronic device;
  acquiring current application data of the application after detecting a change of the initial application data of the application in the electronic device; and
  acquiring the application data to be backed up based on the initial application data and the current application data.

15. The electronic device of claim 14, wherein, acquiring the application data to be backed up based on the initial application data and the current application data comprises:
  acquiring difference between the initial application data and the current application data and determining the difference between the initial application data and the current application data as the application data to be backed up.

16. The electronic device of claim 9, wherein acquiring the update frequencies of the application data comprises:
  acquiring an update count of the application data of an application within a predetermined time period; and
  dividing the update count by the predetermined time period to acquire the update frequency of the application data of the application.

17. The electronic device of claim 9, wherein generating the backup priorities based on the update frequencies comprises:
  acquiring a change amount of the application data of an application within a predetermined time period; and generating the backup priority of the application data based on the change amount and the update frequency of the application data of the application.

\* \* \* \* \*